G. A. Fullerton.
Pipe Coupling.
N° 85,377. Patented Dec. 29, 1868.
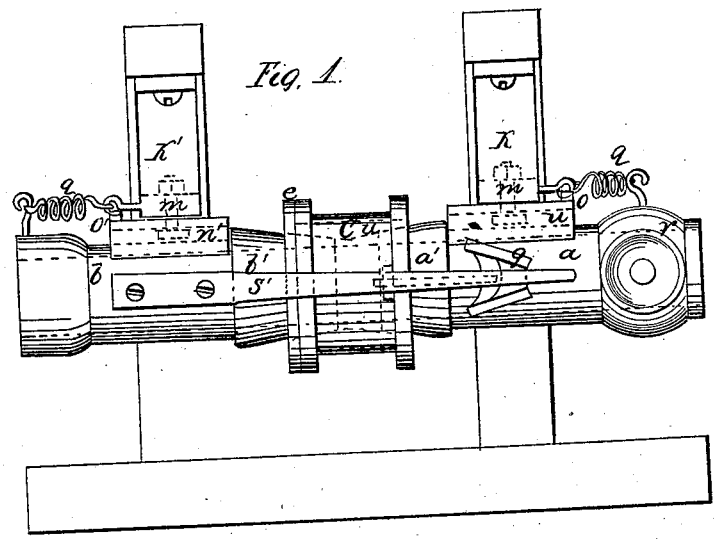
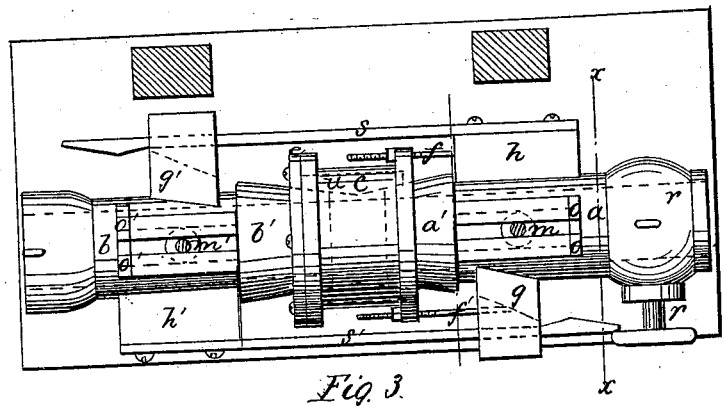
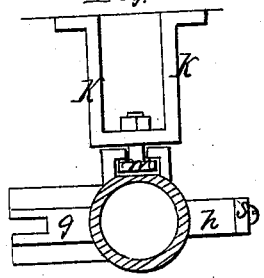
Witnesses,
M. S. G. Wilde.
Wm. Bacheller.
Inventor
Geo. A. Fullerton
by Carroll D. Wright
his Atty.

UNITED STATES PATENT OFFICE.

GEORGE A. FULLERTON, OF LYNN, MASSACHUSETTS.

Letters Patent No. 85,377, dated December 29, 1868.

STEAM-PIPE COUPLING FOR RAILROAD-CAR HEATERS.

The Schedule referred to in these Letters Patent and making part of the same.

*To all whom it may concern:*

Be it known that I, GEORGE A. FULLERTON, of Lynn, in the county of Essex, and State of Massachusetts, have invented a new and improved Coupling for Steam-Pipes for Cars, of which the following is a full, clear, and exact description, reference being had to the accompanying drawings, making a part of this specification, in which—

Figure 1 represents a side elevation of a coupling embodying my invention.

Figure 2 is a plan view of the same, with the attachment to the car cut off.

Figure 3 is a transverse vertical section on the line $x\ x$.

Similar letters refer to the same parts in the several figures.

The object of my invention is to produce a simple and effective coupling for steam-pipes for cars, which is self-attaching and detaching, when the cars are shackled on or off, and thus does not require any particular attention, and which is not liable to get out of order, or become deranged by the jolting and jarring produced by the movements of the cars.

My invention has been suggested by the necessity which exists for heating railroad-cars by steam, in order to avoid the accidents arising from stoves, and the difficulty experienced in applying steam to the heating of cars; and My invention consists in attaching two pipes, which are fastened to different cars, respectively, to a coupling, consisting of a thick rubber band, of such a form as to receive the conical-shaped muzzle-ends of the two pipes, said rubber being surrounded and held in place by a cylinder, with inward-projecting flanges or rings; and My invention consists, further, in the employment of two stiff springs, one attached to each pipe, and projecting towards the opposite one, said springs being provided with a double wedge-shaped point, for the purpose of entering a forked socket on the opposite pipe, and, after the point has passed the latter, to clutch, by the pressure of the springs, the two pipes sufficiently strong together, so as to prevent any separation by the ordinary jolting and jarring of the cars, and short of the unshackling and separation of the cars.

Referring to the drawings—

$a\ b$ are two steam-pipes, to be coupled.

$c$ is the coupling, lined on the inside with a rubber band, $u\ u$, of such form as to receive the conical muzzle-ends $a'\ b'$ of the two pipes.

$h\ h'$ are projections, to which are fastened stiff steel springs $s\ s'$.

The point of these springs has the form of a double wedge, with the bases joined together.

The springs $s\ s'$ enter the forked projections $g\ g'$ of the opposite pipe.

The pipes are provided, at their upper portion, with a projection, $n\ n'$, forming an inverted T or dovetailed groove, into which the head of the bolt $m\ m'$ projects, and thus holds the pipes $a\ b$ to the frame $k\ k'$ of each car, respectively.

The coiled springs $q\ q'$ force the pipes towards the coupling $c$, and the lips $o\ o'$ prevent the slipping of the pipes from the connection with the car, and insure the uncoupling, when the cars become unshackled and separated, by the lips $o\ o'$ stopping the pipes from being pulled further out, and cause the springs $s\ s'$ to yield, to spring back, and spread over the slot and at the forked socket $g\ g'$.

The coupling $c$ is firmly attached to one of the pipes $a$ by means of bolts $f\ f'$.

$r$ is a valve, for letting on or shutting off the steam.

The operation is as follows:

When the cars are brought together and shackled, the stiff steel spring $s'$ enters the enlarged portion of the fork-socket of the opposite pipes, forcing the spring outward, until the wedges have passed the slot of the socket, when the spring $s'$ springs back, and thus clutches the opposite pipe $a$, while the pipe $b$ will be operated on in a like manner by spring $s$.

In unshackling the cars and drawing them apart, the force being greater than the clutching-power of the springs, the pipes being prevented by lips $o\ o'$ to be drawn off the cars, the springs $s\ s'$ will be forced back, the wedges passing through the slot and out of the socket, and thus the pipes $a\ b$ will become unfastened, and the steam may be shut off, by means of valve $r$, either by hand or automatically, by the separation of the pipes.

Having thus fully described my invention,

What I claim as new, and desire to secure by Letters Patent, is—

1. The combination of the springs $s\ s'$, clutching the forks $g\ g'$ of the opposite pipes $a\ b$, substantially in the manner and for the purpose specified.

2. The combination of the rubber band $u\ u$ and coupling $c$ with the conical muzzles of the pipes $a\ b$, in the manner and for the purpose described.

3. The mode of hanging the pipes $a\ b$ to the cars, allowing them a free motion axially, or in a lateral direction, in the manner and for the purpose substantially as set forth.

4. The combination of springs $s$ and $s'$, forked sockets $g$ and $g'$, steam-pipes $a\ b$, coupling $c$, having rubber lining $u$, lips $o\ o'$, bolts $f\ f'$ and $m\ m'$, springs $q\ q'$, and valve $r$, when the whole are constructed and operate relatively to each other, substantially as and for the purpose described and set forth.

In testimony whereof, I have signed my name to this specification in the presence of two subscribing witnesses.

GEORGE A. FULLERTON.

Witnesses:
CARROLL D. WRIGHT,
ALEX. N. REDMAN.